(Model.)

W. R. RODMAN.
GLASS CUTTING FRAME.

No. 270,847. Patented Jan. 16, 1883.

WITNESSES:
Francis McArdle.
C. Sedgwick

INVENTOR:
W. R. Rodman
BY Munn & Co
ATTORNEYS.

UNITED STATES PATENT OFFICE.

WILLIAM R. RODMAN, OF NEW BURNSIDE, ILLINOIS.

GLASS-CUTTING FRAME.

SPECIFICATION forming part of Letters Patent No. 270,847, dated January 16, 1883.

Application filed July 24, 1882. (Model.)

*To all whom it may concern:*

Be it known that I, WILLIAM R. RODMAN, of New Burnside, in the county of Johnson and State of Illinois, have invented a new and Improved Glass-Cutting Frame, of which the following is a full, clear, and exact description.

My invention consists of a base-plate of wood, metal, or other approved material, with a cleat along one edge having an arm or tongue projecting from it at right angles, near one end and a little above the bed-plate, so that the glass plates may be placed under it and cut off squarely by a tool drawing along the tongue for a gage, and a scale of lineal measure is arranged in the bed-plate along the cleat, and also one along the tongue by which to measure the glass for cutting, said scales being seen through the glass when laid on the base-plate, all as hereinafter fully described.

Reference is to be had to the accompanying drawings, forming part of this specification, in which similar letters of reference indicate corresponding parts in both the figures.

Figure 1:
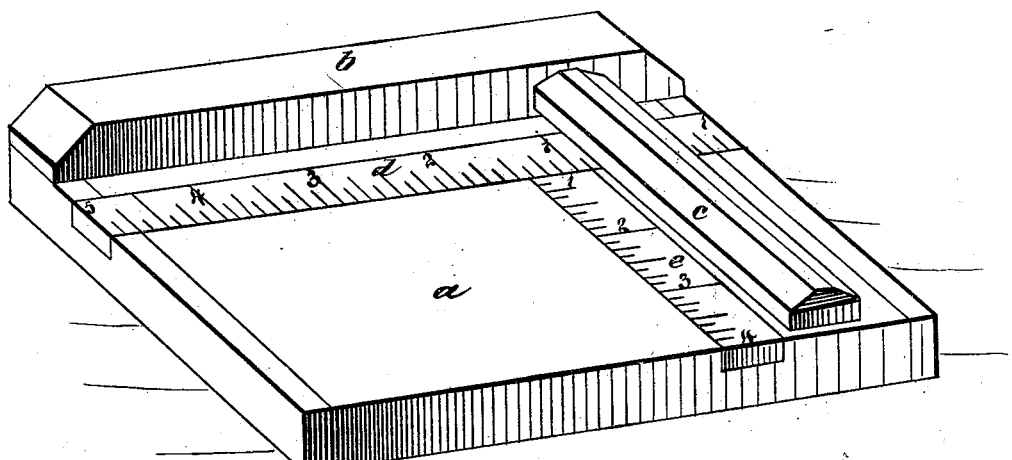
Figure 2:
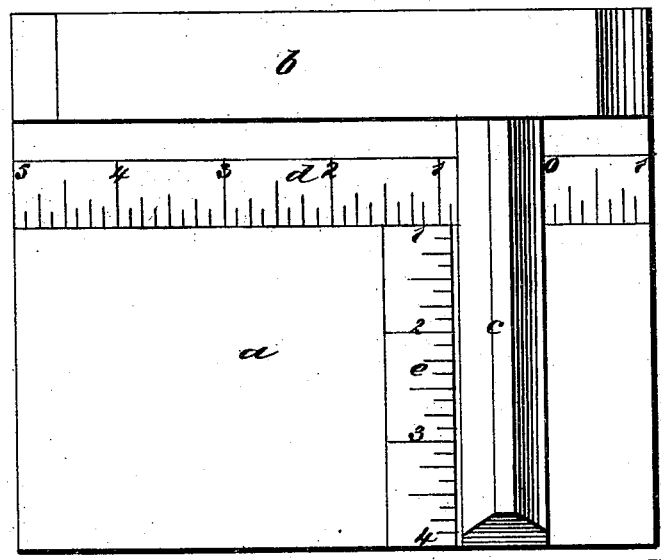

Figure 1 is a perspective view of my improved glass-cutting frame, and Fig. 2 is a plan view.

I take a flat base-plate, $a$, of wood or metal, of suitable size, according to the size of glass to be cut, and apply a straight-edged cleat, $b$, along one edge, said cleat having a tongue, $c$, projecting at right angles from it over the bed-plate, near the edge, so that the glass plates may be slipped under it on the base-plate; and along the cleat and the tongue, respectively, I arrange a scale, $d$ and $e$, in the surface of the bed-plate, so that the measures may be seen through the glass along each of the two sides of the angles when placed thereon for cutting, as will be clearly understood by the drawings.

The frame may be used to advantage without the scales; but it is more convenient and useful with them.

The scale $d$ may be marked on cleat $b$, and scale $e$ may be marked on arm $c$, so that the device may be attached to a counter or table for a platform.

The scales may also be marked upon the platform itself, instead of upon strips sunk into the platform, for more economical manufacture of the device.

Having thus fully described my invention, I claim as new and desire to secure by Letters Patent—

1. The improved frame for glass-cutting, consisting of bed-plate $a$, cleat $b$, and tongue $c$, said tongue being arranged over the bed-plate for sliding the glass under it, substantially as described.

2. The improved frame for glass-cutting, consisting of bed-plate $a$, cleat $b$, tongue $c$, and scales $d$ $e$, substantially as described.

WILLIAM R. RODMAN.

Witnesses:
J. A. SMITH,
G. W. MEADORS.